(12) United States Patent
Masala et al.

(10) Patent No.: US 9,926,976 B2
(45) Date of Patent: Mar. 27, 2018

(54) THRUST BEARING, A TURBOMACHINE, AND A METHOD OF MAKING A BEARING ROTOR DISK FOR AN ELECTROMAGNETIC THRUST BEARING IN A TURBOMACHINE

(71) Applicant: Nuovo Pignone Srl, Florence (IT)

(72) Inventors: Andrea Masala, Florence (IT);
Eugenio Giorni, Florence (IT);
Massimo Camatti, Florence (IT);
Michelangelo Bellacci, Florence (IT)

(73) Assignee: Nuovo Pignone Srl, Florence (IT)

( * ) Notice: Subject to any disclaimer, the term of this patent is extended or adjusted under 35 U.S.C. 154(b) by 379 days.

(21) Appl. No.: 14/429,804

(22) PCT Filed: Sep. 19, 2013

(86) PCT No.: PCT/EP2013/069485
§ 371 (c)(1),
(2) Date: Mar. 20, 2015

(87) PCT Pub. No.: WO2014/044761
PCT Pub. Date: Mar. 27, 2014

(65) Prior Publication Data
US 2015/0275965 A1    Oct. 1, 2015

(30) Foreign Application Priority Data
Sep. 20, 2012  (IT) .............. CO2012A0045

(51) Int. Cl.
*H02K 7/09* (2006.01)
*F16C 32/00* (2006.01)
(Continued)

(52) U.S. Cl.
CPC .......... *F16C 32/0476* (2013.01); *F01D 25/16* (2013.01); *F16C 32/0468* (2013.01);
(Continued)

(58) Field of Classification Search
CPC ... H02K 7/09; F16C 32/0476; F16C 32/0468; F16C 39/06; F16C 43/00; F16C 2202/00;
(Continued)

(56) References Cited

U.S. PATENT DOCUMENTS 4,652,780 A    3/1987  Murakami et al.
5,021,697 A    6/1991  Kralick
(Continued)

FOREIGN PATENT DOCUMENTS

EP    1967286 A2    10/2008
EP    1967288 A2    10/2008
(Continued)

OTHER PUBLICATIONS

Machine translation of JP 05196041 A (Aug. 1993).*
(Continued)

*Primary Examiner* — Michael Andrews
(74) *Attorney, Agent, or Firm* — GE Global Patent Operation

(57) ABSTRACT

A thrust bearing comprises an electromagnetic stator with a stator surface and a rotor disk with a rotor surface facing the stator surface. The rotor disk comprises a radially inner portion made of a first material directly and exclusively connected to a radially outer portion made of a second material. The first material is a corrosion resistant metal or metal alloy and the second material is a ferromagnetic metal or metal alloy.

15 Claims, 4 Drawing Sheets

(51) Int. Cl.
  *F16C 32/04* (2006.01)
  *F01D 25/16* (2006.01)
  *F16C 39/06* (2006.01)
  *F16C 43/00* (2006.01)

(52) U.S. Cl.
  CPC .............. *F16C 39/06* (2013.01); *F16C 43/00* (2013.01); *H02K 7/09* (2013.01); *F05B 2260/95* (2013.01); *F16C 2202/00* (2013.01); *F16C 2300/42* (2013.01); *F16C 2360/24* (2013.01); *Y10T 29/49009* (2015.01)

(58) Field of Classification Search
  CPC .. F16C 2300/42; F16C 2360/24; F01D 25/16; F05B 2260/95
  USPC ........................................................ 310/90.5
  See application file for complete search history.

(56) References Cited

U.S. PATENT DOCUMENTS

| | | |
|---|---|---|
| 5,749,700 A | 5/1998 | Henry et al. |
| 6,232,688 B1 | 5/2001 | Ress, Jr. et al. |
| 6,247,638 B1 | 6/2001 | Ress, Jr. |
| 2003/0107283 A1 | 6/2003 | Suzuki et al. |
| 2007/0262668 A1* | 11/2007 | Brisson ............... F16C 32/0468 310/90.5 |
| 2010/0187926 A1 | 7/2010 | Baudelocque et al. |

FOREIGN PATENT DOCUMENTS

| | | | |
|---|---|---|---|
| JP | 05196041 A * | 8/1993 | ............ F16C 32/047 |
| JP | H05196041 A | 8/1993 | |
| RU | 2216662 C1 | 11/2003 | |
| SU | 1059302 A1 | 12/1983 | |
| WO | 2010040535 A1 | 4/2010 | |

OTHER PUBLICATIONS

Unofficial English Translation of Chinese Office Action issued in connection with corresponding CN Application No. 201380049232.X dated Aug. 28, 2015.
Italian Search Report dated Jun. 17, 2013 which was issued in connection with Italian Patent Application No. CO2012A000045 which was filed on Sep. 20, 2012.
International Search Report and Written Opinion dated Nov. 4, 2013 which was issued in connection with PCT Patent Application No. PCT/EP13/069485 which was filed on Sep. 19, 2013.
Unofficial English translation of Notice of Allowance issued in connection with corresponding RU Application No. 2015108288 dated May 26, 2017.

* cited by examiner

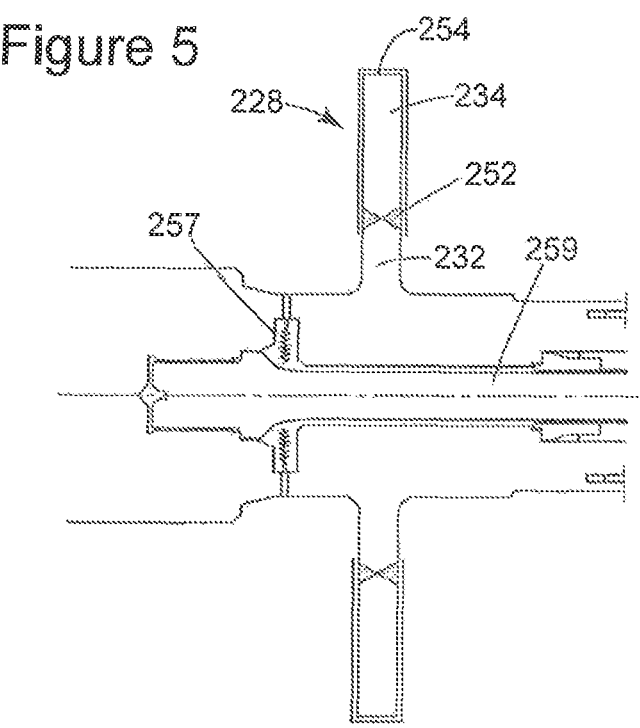
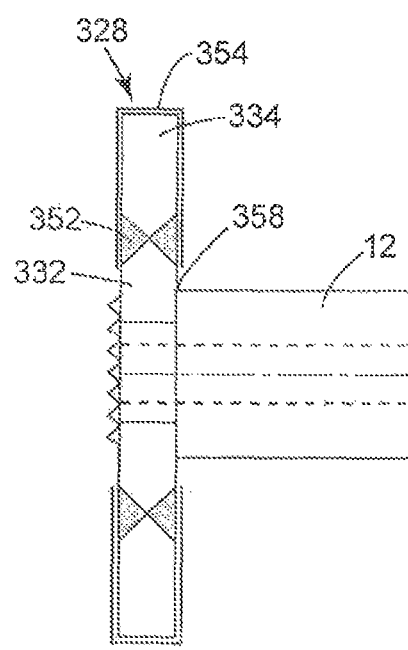
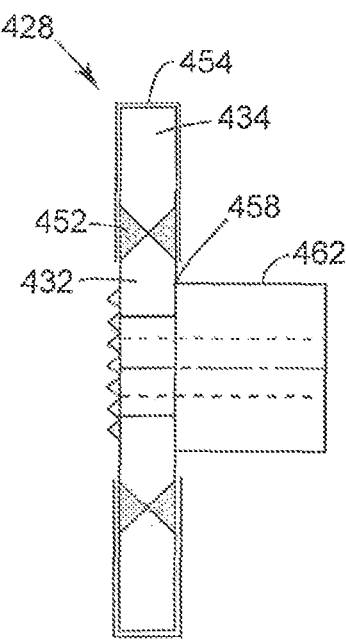
Figure 5
Figure 6
Figure 7

THRUST BEARING, A TURBOMACHINE, AND A METHOD OF MAKING A BEARING ROTOR DISK FOR AN ELECTROMAGNETIC THRUST BEARING IN A TURBOMACHINE

BACKGROUND

Embodiments of the subject matter disclosed herein generally relate to thrust bearings, and more particularly, to a magnetic thrust bearing for a turbo machine.

Turbo machines, such as turbo expanders or compressors, may be used to facilitate the addition or extraction of energy from a process fluid. In a typical turbo machine, a shaft mounted impeller, or rotor, is supported for rotation relative to a machine stator. In order to counteract thrust forces in the rotating shaft which may be generated by interaction of the impeller and the process fluid, a turbo machine may incorporate axial magnetic bearings.

Unlike more traditional bearings such as roller bearings or fluid film bearings, axial magnetic bearings require no lubricant which could contaminate the process fluid. As a result, turbo machines incorporating axial magnetic bearings may be operated without a seal between the process fluid and the axial magnetic bearings. However, this may result in exposure of the bearing to harmful contaminants which may be present in the process fluid. For example, if natural gas is being processed, significant levels of hydrogen sulfide ($H_2S$), carbon dioxide ($CO_2$), water, etc. may be present. These contaminants combine with natural gas to form a mixture called sour gas which is particularly corrosive to the steel components of conventional axial magnetic bearings. Sustained exposure to sour gas often results in sulfide stress cracking of such components. This process may cause bearing components to wear out prematurely, or worse, fail catastrophically.

Accordingly, what is needed is an axial magnetic bearing which may be more readily exposed to potentially corrosive fluids and which may otherwise provide improved performance to the turbo machine in which it is installed.

SUMMARY

According to an exemplary embodiment, a thrust bearing comprises an electromagnetic stator with a stator surface and a rotor disk. A rotor disk is rotatable relative to the stator and has a rotor surface facing the stator surface. The rotor disk comprises a radially inner portion made of a first material directly and exclusively connected to a radially outer portion made of a second material; the first material is a corrosion resistant metal or metal alloy and the second material is a ferromagnetic metal or metal alloy.

According to another exemplary embodiment, a turbo machine comprises a machine stator and a machine rotor rotatable relative to the machine stator. A thrust bearing is disposed between the machine stator and the machine rotor. The thrust bearing comprises an electromagnetic stator with a stator surface and a rotor disk. A rotor disk is rotatable relative to the stator and has a rotor surface facing the stator surface. The rotor disk comprises a radially inner portion made of a first material directly and exclusively connected to a radially outer portion made of a second material; the first material is a corrosion resistant metal or metal alloy and the second material is a ferromagnetic metal or metal alloy.

According to another exemplary embodiment, a method of making a bearing rotor disk for an electromagnetic thrust bearing in a turbo machine can include the steps of forming a radially inner portion of the bearing rotor disk from a corrosion resistant metal or metal alloy, forming a radially outer portion of the bearing rotor disk from a ferromagnetic metal or metal alloy, and connecting directly the radially inner portion to the radially outer portion.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 5 is a rotor disk of another alternative embodiment.
FIG. 6 is a rotor disk of another alternative embodiment.
FIG. 7 is a rotor disk of another alternative embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of turbo machine systems. However, the embodiments to be discussed next are not limited to these exemplary systems, but may be applied to other systems.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
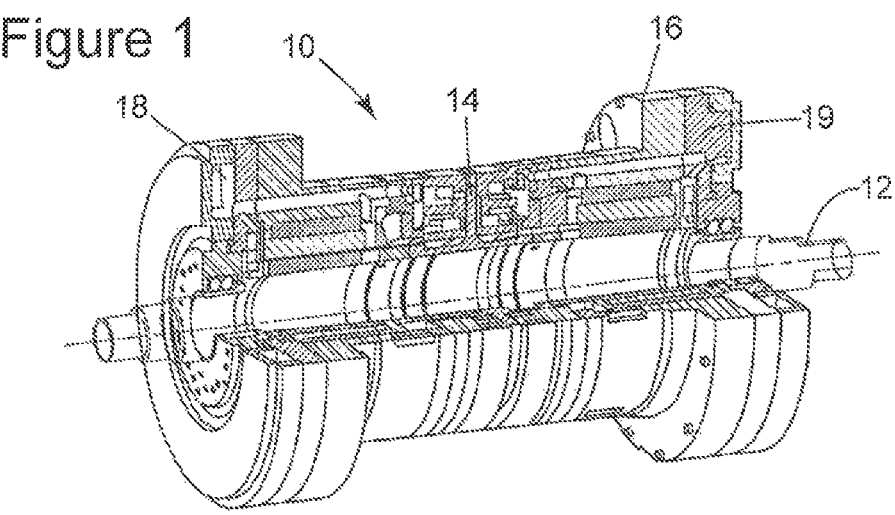
FIG. 1 is a perspective view of a turbo machine.

An exemplary embodiment of a turbo machine 10 incorporating an axial magnetic bearing 14 is shown in FIG. 1. Turbo machine 10 is a combined turbo expander and compressor machine including a machine rotor 12 and a machine stator 16. Machine rotor 12 includes a pair of impellers 18 and 19, although it will be understood that other turbo machines may include more or fewer impellers. During operation, the impeller 18 of the turbo expander section of turbo machine 10 provides a counterbalancing thrust to the impeller 19 of the compressor section. Further control of rotor thrust may be provided by axial magnetic bearing 14.

Figure 2:
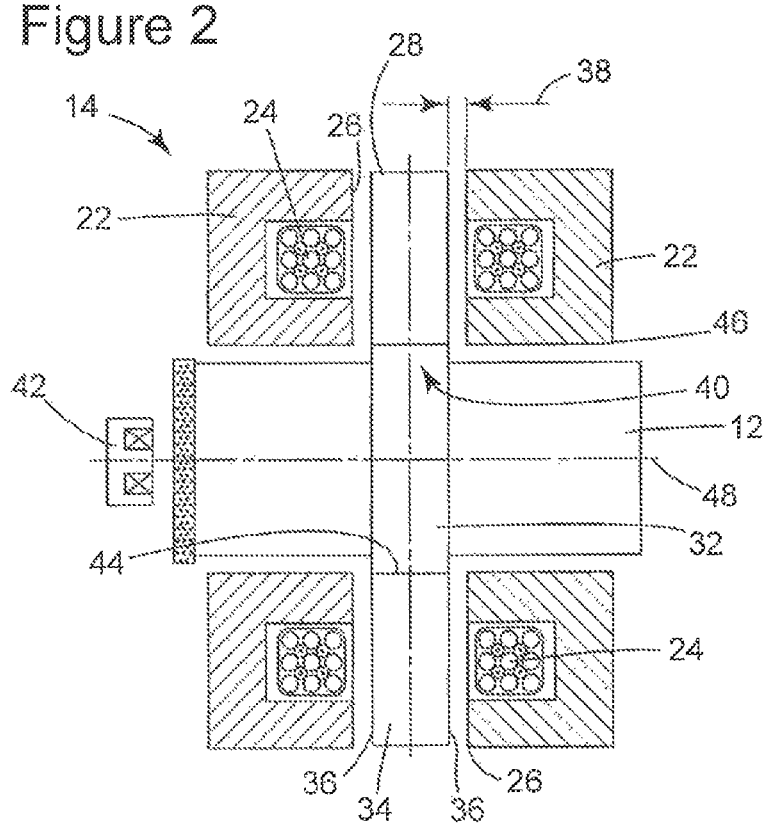
FIG. 2 is a cross-sectional view of an exemplary embodiment of an axial magnetic bearing.

As shown in FIG. 2, axial magnetic bearing 14 includes an electromagnetic stator 22 which defines a pair of opposed axial surfaces 26. A rotor disk 28 is connected to machine rotor 12, in particular a rotor shaft, and includes a pair of radially extending surfaces 36 each facing a respective one of the electromagnetic stator surfaces 26.

During operation, a sensor 42 provides information regarding axial movement of rotor disk 28 to a processor (not shown) which controls power to coils 24 in stator 22. The resulting electromagnetic force provided by coils 24 draws the radial portion 34 of rotor disk 28 toward one of the axial surfaces 26 of stator 22 to maintain a running gap 38 within an acceptable range.

The relationship between the power applied to the coils 24 and the force with which rotor disk 28 is drawn toward each axial surface 26 of stator 22 is dependent, in part, on the ferromagnetic properties of the material used to construct rotor disk 28. Specifically, materials with good ferromagnetic properties require less power to induce a desired axial movement of rotor disk 28. However, as previously discussed, steel compositions having chemical composition and microstructural properties in order to exhibit good ferromagnetic properties are typically more susceptible to corrosion, specifically, from sulfide stress cracking.

Thus, according to an embodiment, bearing 14 may include a rotor disk 28 having a radially inner portion 32 made of a first material, for example a metal or a metal alloy, which is resistant to corrosion and capable of withstanding high bending and centrifugal loads. Rotor disk 28 also include also a radial outer portion 34 made of a second material, for example a metal or a metal alloy, having sufficient ferromagnetic properties to produce an efficient response to the power input of electromagnetic stator 22. For example, radial outer portion 34 may be constructed of a material providing a magnetic flux density higher than 0.8 Tesla and radial inner portion 32 may be constructed of a corrosion resistant material. For example, radial inner portion 32 may be constructed of a precipitation hardened nickel alloy with low ferromagnetic properties, such as INCONEL® 718, manufactured by Special Metals Corporation. Accordingly, rotor disk 28, and thus, bearing 14, may provide superior thrust correction along with improved strength and resistance to corrosion.

Radial inner portion 31 is disk shaped, in particular cylindrical shaped, and radial outer portion 34 is ring shaped, in particular with a rectangular radial cross-section.

Radial inner portion 32 is axially adjacent of both its sides to a shaft of the machine rotor 12; in particular, radial inner portion 32 and the machine rotor shaft have substantially the same axial cross-section.

Radial inner portion 32 is connected directly and exclusively to radial outer portion 34 of rotor disk 28 at an interface 44 by, for example, a chemical connection, such as an adhesive or a weld; in this way, radial inner portion 31 and radial outer portion 34 are radially adjacent. Alternatively or additionally, radial inner portion 32 may be connected to radial outer portion 34 at interface 44 by a mechanical connection, such as a shrink fit, a slot and keyway arrangement, or a fastener.

Radial inner portion 32 and radial outer portion 34 may be configured such that interface 44 defines a circle around rotor axis 48 disposed at substantially the same distance from the rotor axis 48 as the inner diameter 46 of electromagnetic stator 22. Alternatively, interface 44 may be non-circular and/or disposed further or closer to rotor axis 48 than the inner surface of electromagnetic stator 22.

As the ferromagnetic material of the bearing is self-supporting and is not enclosed inside a shell or cover, the gap between the ferromagnetic material of the bearing and the coils of the bearing corresponds to the air gap between the rotor and the stator; in this way the effectiveness of the bearing is maximized.

Figure 3:
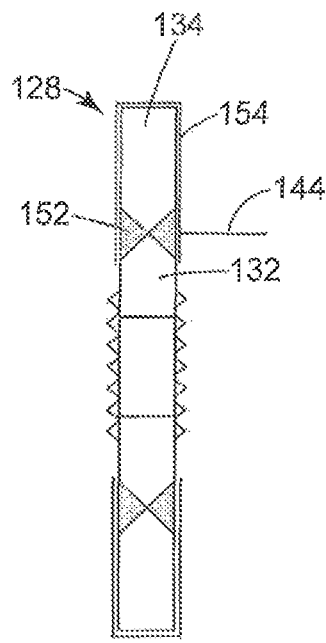
FIG. 3 is a rotor disk of an alternative embodiment.

FIG. 3 shows another exemplary embodiment. Rotor disk 128 includes an inner radial portion 132 made of a corrosion resistant stainless steel alloy, specifically, INCONEL® 625 manufactured by Special Metals Corporation and an outer radial portion 134 made of a low alloy steel with sufficient ferromagnetic properties to optimize the power response of bearing 14. As further shown in FIG. 3, inner radial portion 132 and outer radial portion 134 are connected by a corrosion resistant bimetallic weld 152 according to NACE ISO 15156 (MR0175) along interface 144. It should be appreciated by those skilled in the art that the specific materials and welds mentioned in this paragraph are purely illustrative of certain materials and welds that can be used in embodiments, and that the invention is not limited to such specific materials and welds but can, instead include other material types and weld types.

In a simulation, a rotor disk 128 according to the exemplary embodiment of FIG. 3 with an inner diameter of 60 mm and an outer diameter of 360 mm was tested. In the first test, the diameter of interface 144 and inner diameter 46 of electromagnetic stator 22 were provided at 100 mm from the axis 48 of machine rotor 12. In a second test the diameter of interface 144 and inner diameter 46 of electromagnetic stator 22 were provided at 125 mm from the axis 48 of machine rotor 12. The resulting load capacity for the 100 mm sample was 30 kN and the resulting load capacity for the 125 mm sample was 20 kN. Thus, it can be seen that thrust force capacity is generally inversely proportional to interface diameter in a bearing 14 with a radial inner portion 132 made of a first corrosion resistant material and a radial outer portion 134 made of a second ferromagnetic material according to embodiments.

Figure 4:
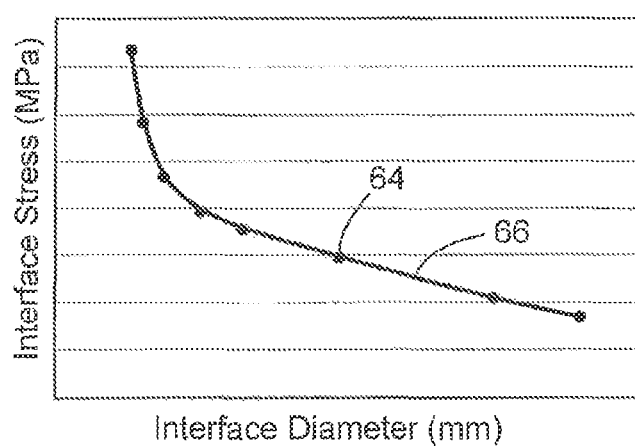
FIG. 4 shows an example of test results of a bearing according to an exemplary embodiment showing a relationship between the diameter of an interface and the stress present at the interface.

FIG. 4 shows an exemplary relationship between the diameter of interface 144 and the stress present at interface 144 for a rotor disk 128 with an inner diameter of 60 mm and an outer diameter of 360 mm spinning at 17860 rpm. At 100 mm, data point 64 shows a stress at interface 144 of approximately 300 MPa. At 125 mm, data point 66 shows a stress at interface 144 of approximately 275 MPa. From this relationship it can be seen that a lower centrifugal load (stress) on interface 144 may be achieved when interface 144 is moved radially away from axis 48.

A protective layer (or coating) 154 may be applied to the low alloy steel of outer radial portion 134 in order to provide further protection from sour corrosion. As shown in FIG. 3, protective layer 154 may extend beyond interface 144, for example, to provide protection for weld 152. Protective layer 154 may include a cladding such as a metal, for example, the metal of inner radial portion 132, tantalum, or another corrosion resistant metallic, ceramic or polymeric coating. Such a cladding may be applied, for example, by a cold spray deposition process. Protective layer 154 may provide outer radial portion 134 with the capacity to resist corrosion at least to the same extent as inner radial portion 132.

Since rotor disk 128 may be installed without a protective layer on inner radial portion 132, the shrink fit of rotor disk 128 to machine rotor 12 is less likely to damage the protective layer 154. This feature also allows for easy implementation of other connection arrangements. For example, and as further shown in FIG. 5, rotor disk 228 may include inner radial portion 232 and outer radial portion 234 attached to one another at an interface by bi-metallic weld 252 and having a coating 254. The embodiment of FIG. 5 may further include a hirth coupling 257 and a central tie-rod 259 to provide increased coupling force between machine rotor 12 and rotor disk 228. Alternatively, and as shown in FIG. 6, rotor disk 328 may include inner radial portion 332 and outer radial portion 334 attached to one another at an interface by bi-metallic weld 352 and having a coating 354.

The rotor disk 328 can be connected directly to machine 12, for example, by a weld at interface 358. In still another alternative embodiment shown in FIG. 7, rotor disk 428 may include inner radial portion 432 and outer radial portion 434 attached to one another at an interface by bi-metallic weld 452 and having a coating 454. Rotor disk 428 may also be provided with a thrust collar 462 which provides greater surface area for connection of rotor disk 428 to machine rotor 12.

Layer 154, coating 254, coating 354, coating 454 are not designed to connect the radial outer portion of the rotor disk to the radial inner portion of the rotor disk; indeed, due to their very small thickness (e.g. 0.5 mm or less), they do not provide any connection or support function but simply a protection function.

Figure 8:
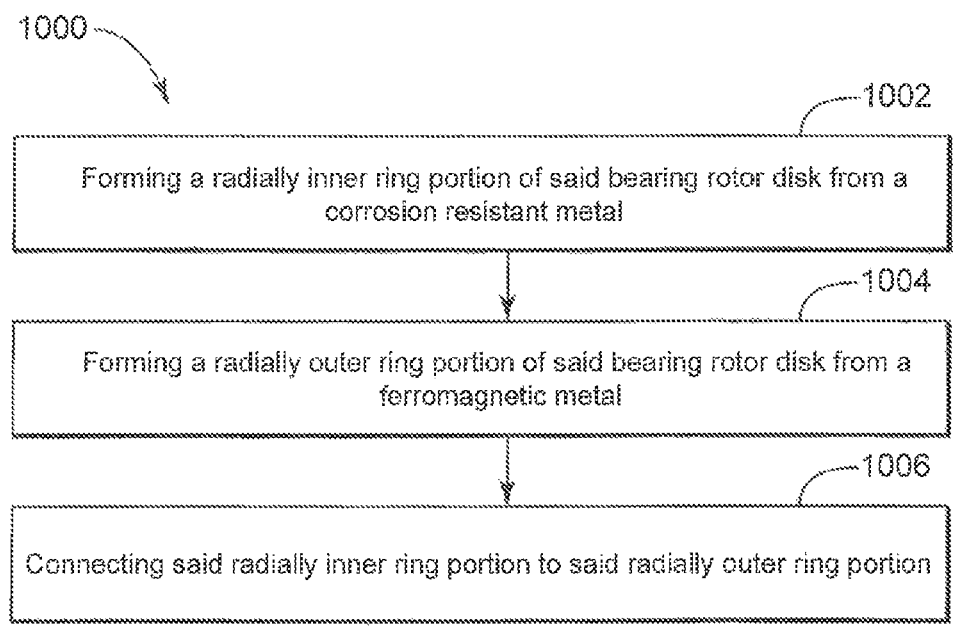
FIG. 8 shows a method according to another exemplary embodiment.

Thus, according to an exemplary embodiment as shown in the flowchart of FIG. 8, a method (1000) of making a bearing rotor disk for an electromagnetic thrust bearing in a turbo machine can include the steps of forming (1002) a radially inner portion of the bearing rotor disk from a corrosion resistant metal, forming (1004) a radially outer portion of the bearing rotor disk from a ferromagnetic metal, and connecting (1006) the radially inner portion to the radially outer portion.

The above-described embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thrust bearing, comprising:
   an electromagnetic stator comprising a stator surface; and
   a rotor disk rotatable relative to the electromagnetic stator and comprising a rotor surface facing the stator surface,
   wherein the rotor disk comprises a radially inner portion made of a first material directly and exclusively connected to a radially outer portion made of a second material,
   the first material is a corrosion resistant metal or metal alloy,
   the second material is a ferromagnetic metal or metal alloy
   the radially outer portion comprises a protective layer, coating, or cladding made of a corrosion resistant material, and
   the protective layer, coating, or cladding extends from the radially outer portion beyond an interface between the radially outer portion and the radially inner portion.

2. The thrust bearing of claim 1, wherein the radially inner portion is disk shaped and the radially outer portion is ring shaped, and wherein the outer portion is radially adjacent to the inner portion.

3. The thrust bearing of claim 2, wherein the radially outer portion is welded to the radially inner portion.

4. The thrust bearing of claim 1, wherein the radially outer portion is welded to the radially inner portion.

5. The thrust bearing of claim 1, wherein the protective layer, coating or cladding is made of the first material.

6. A turbo machine, comprising:
   a machine stator;
   a machine rotor rotatable relative to the machine stator;
   a thrust bearing disposed between the machine stator and the machine rotor, the thrust bearing comprising:
      an electromagnetic stator having a stator surface, and
      a rotor disk rotatable relative to the electromagnetic stator and having a rotor surface facing the stator surface;
      wherein the rotor disk comprises a radially inner portion made of a first material directly and exclusively connected to a radially outer portion made of a second material;
      the first material is a corrosion resistant metal or metal alloy, and
      the second material is a ferromagnetic metal or metal alloy
      the radially outer portion comprises a protective layer, coating, or cladding made of a corrosion resistant material, and
      the protective layer, coating, or cladding extends from the radially outer portion beyond an interface between the radially outer portion and the radially inner portion.

7. The turbo machine of claim 6, wherein the radially inner portion is axially adjacent to a shaft of the machine rotor at least on one side.

8. The turbo machine of claim 6, wherein the radially inner portion and the machine rotor shaft have substantially the same axial cross-section.

9. The turbo machine of claim 6, wherein the radially inner portion is disk shaped and the radially outer portion is ring shaped, and wherein the outer portion is radially adjacent to the inner portion.

10. The turbo machine of claim 6, wherein the radially outer portion is welded to the radially inner portion.

11. The turbo machine of claim 6, wherein the radially inner portion is axially adjacent to a shaft of the machine rotor on both sides.

12. A method of making a bearing rotor disk for an electromagnetic thrust bearing in a turbo machine, the method comprising:
    forming a radially inner portion of the bearing rotor disk from a corrosion resistant metal or metal alloy;
    forming a radially outer portion of the bearing rotor disk from a ferromagnetic metal or metal alloy;
    connecting the radially inner portion directly to the radially outer portion; and
    disposing a protective layer, coating, or cladding on the radially outer portion such that the protective layer, coating, or cladding extends from the radially outer portion beyond an interface between the radially outer portion and the radially inner portion, the protective layer, coating, or cladding being made of a corrosion resistant material.

13. The method of claim 12, wherein the radially outer portion is welded to the radially inner portion.

14. The method of claim 12, further comprising forming a thrust collar made of the corrosion resistant material to the radially inner ring portion for engagement with a rotor shaft of the turbo machine.

15. The turbo machine of claim 12, wherein the protective layer, coating, or cladding is made of the first material.

* * * * *